United States Patent
Schwan

(10) Patent No.: US 10,946,755 B2
(45) Date of Patent: Mar. 16, 2021

(54) PLUG SOCKET WITH A LOCKING ELEMENT WHICH IS MOVABLE IN THE PLUG-IN DIRECTION

(71) Applicant: TE Connectivity Germany GmbH, Bensheim (DE)

(72) Inventor: Ralf Schwan, Einhausen (DE)

(73) Assignee: TE Connectivity Germany GmbH, Bensheim (DE)

(*) Notice: Subject to any disclaimer, the term of this patent is extended or adjusted under 35 U.S.C. 154(b) by 0 days.

(21) Appl. No.: 16/803,061

(22) Filed: Feb. 27, 2020

(65) Prior Publication Data

US 2020/0198485 A1    Jun. 25, 2020

Related U.S. Application Data

(63) Continuation of application No. PCT/EP2018/073025, filed on Aug. 27, 2018.

(30) Foreign Application Priority Data

Aug. 28, 2017   (DE) .......................... 102017215010.6

(51) Int. Cl.
*H01R 13/627* (2006.01)
*B60L 53/16* (2019.01)
*H01R 13/635* (2006.01)
*H01R 13/639* (2006.01)

(52) U.S. Cl.
CPC .......... *B60L 53/16* (2019.02); *H01R 13/6271* (2013.01); *H01R 13/635* (2013.01); *H01R 13/6397* (2013.01); *H01R 2201/26* (2013.01)

(58) Field of Classification Search
CPC ............ H01R 13/6275; H01R 13/6272; H01R 25/142; H01R 13/5216
USPC .................................. 439/353, 350, 94, 521
See application file for complete search history.

(56) References Cited

U.S. PATENT DOCUMENTS

| | | | | |
|---|---|---|---|---|
| 5,558,533 A | * | 9/1996 | Hashizawa | .......... H01R 13/639 439/310 |
| 2015/0343913 A1 | | 12/2015 | Fukai et al. | |
| 2016/0280086 A1 | | 9/2016 | Lopez et al. | |

FOREIGN PATENT DOCUMENTS

| | | |
|---|---|---|
| EP | 2955795 A1 | 12/2015 |
| WO | 2015040154 A1 | 3/2015 |

OTHER PUBLICATIONS

PCT Notification, The International Search Report and the Written Opinion, International Application No. PCT/EP2018/073025, dated Oct. 17, 2018, 15 pages.

* cited by examiner

Primary Examiner — Phuong Chi Thi Nguyen
(74) Attorney, Agent, or Firm — Barley Snyder

(57) ABSTRACT

A plug socket includes a recess receiving a charging plug in a plug-in direction and a locking element movable from a plug-in position into a blocking position. The recess terminates in an insertion opening in the plug-in direction and has an undercut acting in the plug-in direction to latch a latching element of the charging plug. The locking element in the plug-in position is located in the recess and overlaps the undercut transverse to the plug-in direction. The blocking position is spaced apart from the plug-in position in the plug-in direction and the locking element is located closer to the insertion opening in the blocking position than in the plug-in position.

15 Claims, 4 Drawing Sheets

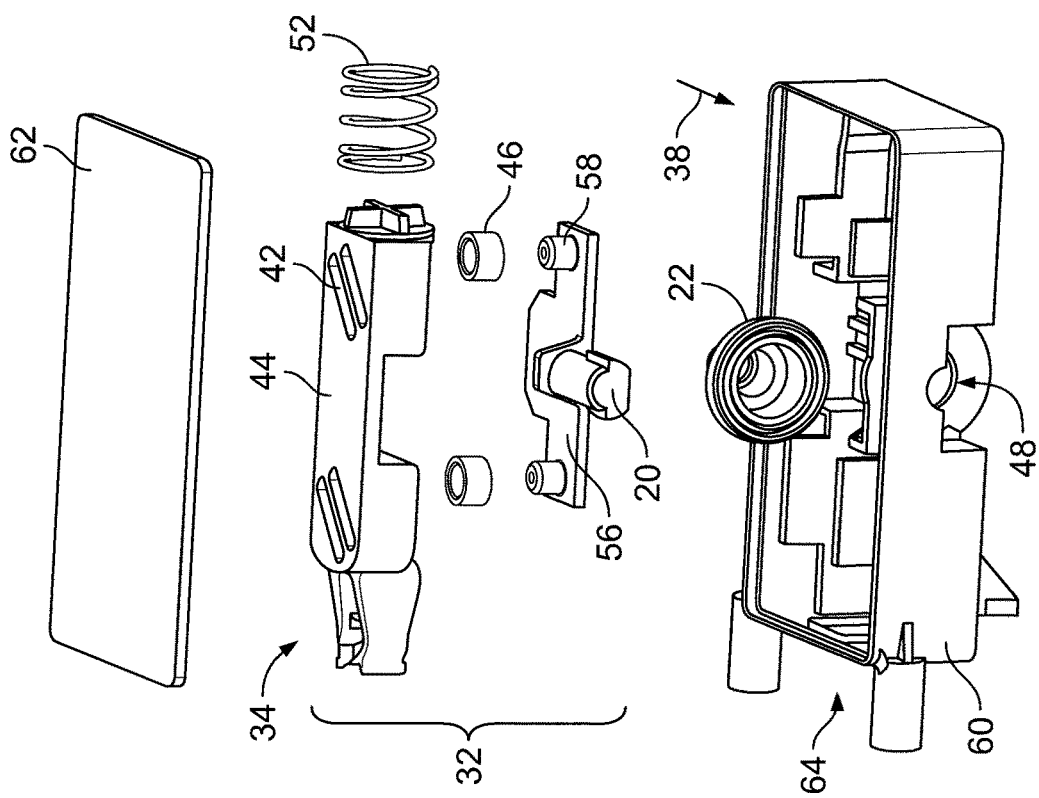
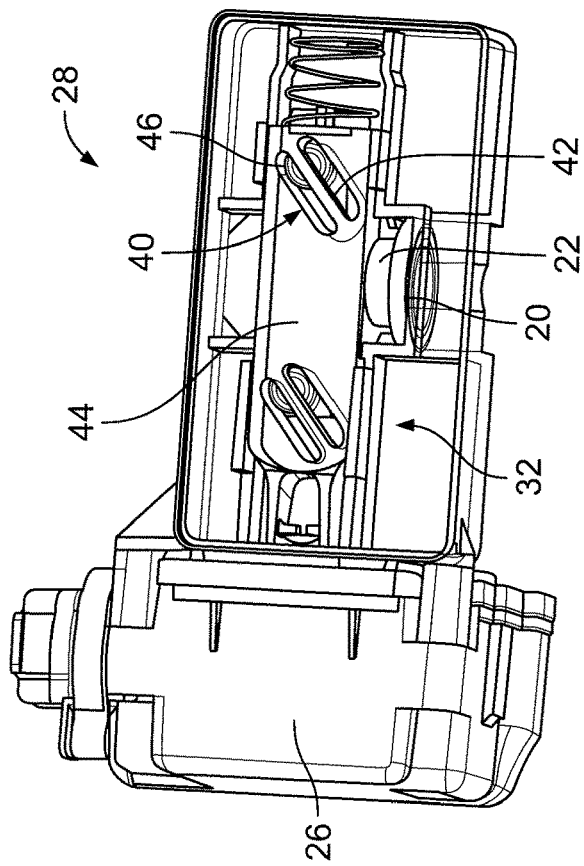
Fig. 6
Fig. 5

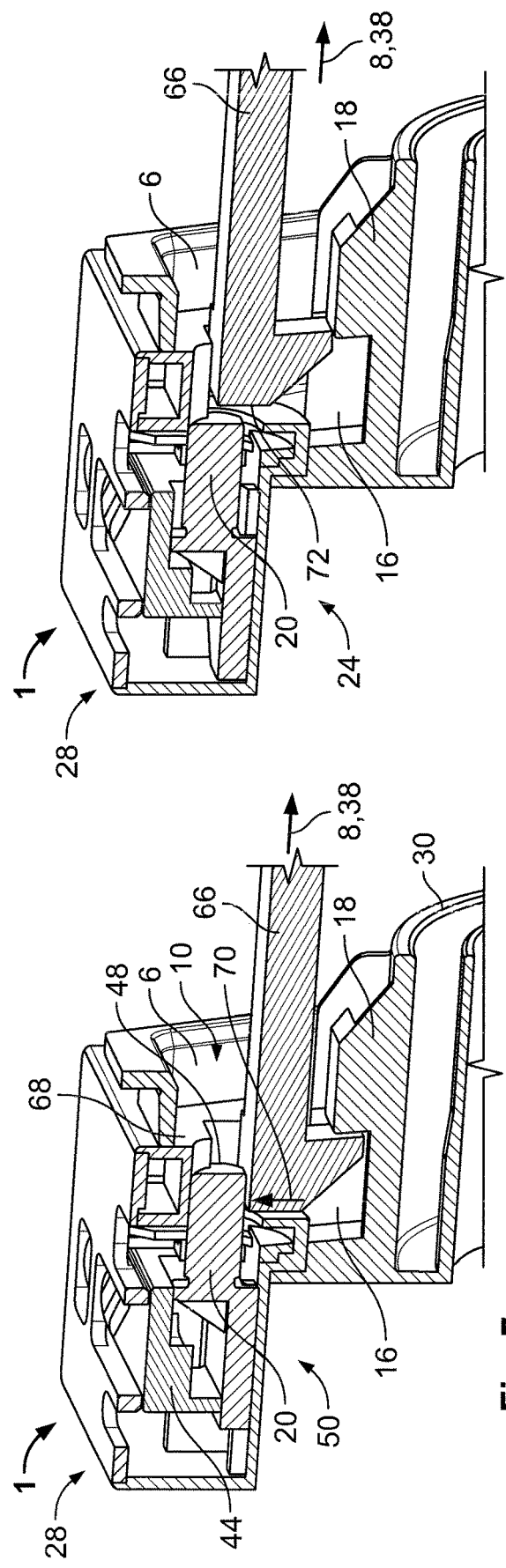
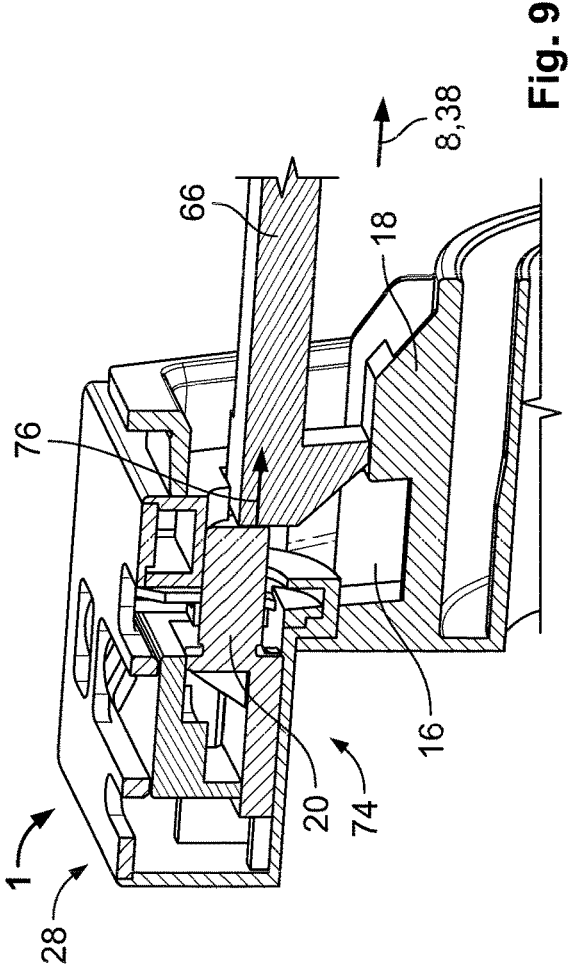

PLUG SOCKET WITH A LOCKING ELEMENT WHICH IS MOVABLE IN THE PLUG-IN DIRECTION

CROSS-REFERENCE TO RELATED APPLICATIONS

This application is a continuation of PCT International Application No. PCT/EP2018/073025, filed on Aug. 27, 2018, which claims priority under 35 U.S.C. § 119 to German Patent Application No. 102017215010.6, filed on Aug. 28, 2017.

FIELD OF THE INVENTION

The present invention related to a plug socket and, more particularly, to a plug socket with a locking element.

BACKGROUND

A plug socket, in particular a charging socket for charging electrically operated motor vehicles provided with a charging plug, has a recess open in a plug-in direction for receiving at least one part of the charging plug, an undercut acting in the plug-in direction for latching a latching element of the charging plug, and a locking element movable from a plug-in position into a blocking position. The locking element in the blocking position is located in the recess and overlaps the undercut transverse to the plug-in direction. With the help of the locking element, a latching between the charging plug and the plug socket is blocked. Without releasing this block, the charging plug cannot be pulled out of the charging socket.

The latching element at the charging plug side is, for example, hook-shaped and can snap into the undercut in order to latch the plug socket and charging plug to one another. If, in the blocking position of the locking element, the undercut is overlapped, the latching element of the charging plug is blocked and can no longer be moved out of the undercut. By contrast, engaging the latching element in the undercut is intended to be possible in the plug-in position. The locking element moves transverse to the plug-in direction from the plug-in position into the blocking position.

SUMMARY

A plug socket includes a recess receiving a charging plug in a plug-in direction and a locking element movable from a plug-in position into a blocking position. The recess terminates in an insertion opening in the plug-in direction and has an undercut acting in the plug-in direction to latch a latching element of the charging plug. The locking element in the plug-in position is located in the recess and overlaps the undercut transverse to the plug-in direction. The blocking position is spaced apart from the plug-in position in the plug-in direction and the locking element is located closer to the insertion opening in the blocking position than in the plug-in position.

BRIEF DESCRIPTION OF THE DRAWINGS

The invention will now be described by way of example with reference to the accompanying Figures, of which:

FIG. 5 is a perspective view of a locking module for a plug socket;

FIG. 6 is an exploded perspective view of the deflection device of the locking module of FIG. 5;

FIG. 7 is a sectional perspective view of a latching element with the plug socket in a blocking position;

FIG. 8 is a sectional perspective view of the latching element with the plug socket in a plug-in position; and FIG. 9 is a sectional perspective view of the latching element with the plug socket in an intermediate position.

DETAILED DESCRIPTION OF THE EMBODIMENT(S)

The invention is explained below by way of example with reference to the attached drawings using an embodiment. The same reference numbers are used in the figures for elements which correspond to one another in function and/or structure. The combination of features of the exemplary embodiment is only for ease of understanding. In accordance with the above embodiments, features can be omitted if their technical effect is unimportant in the case of a specific application. Conversely, the described feature combination can be supplemented by at least one additional feature if the technical effect of the additional feature is required for a specific application.

Figure 1:
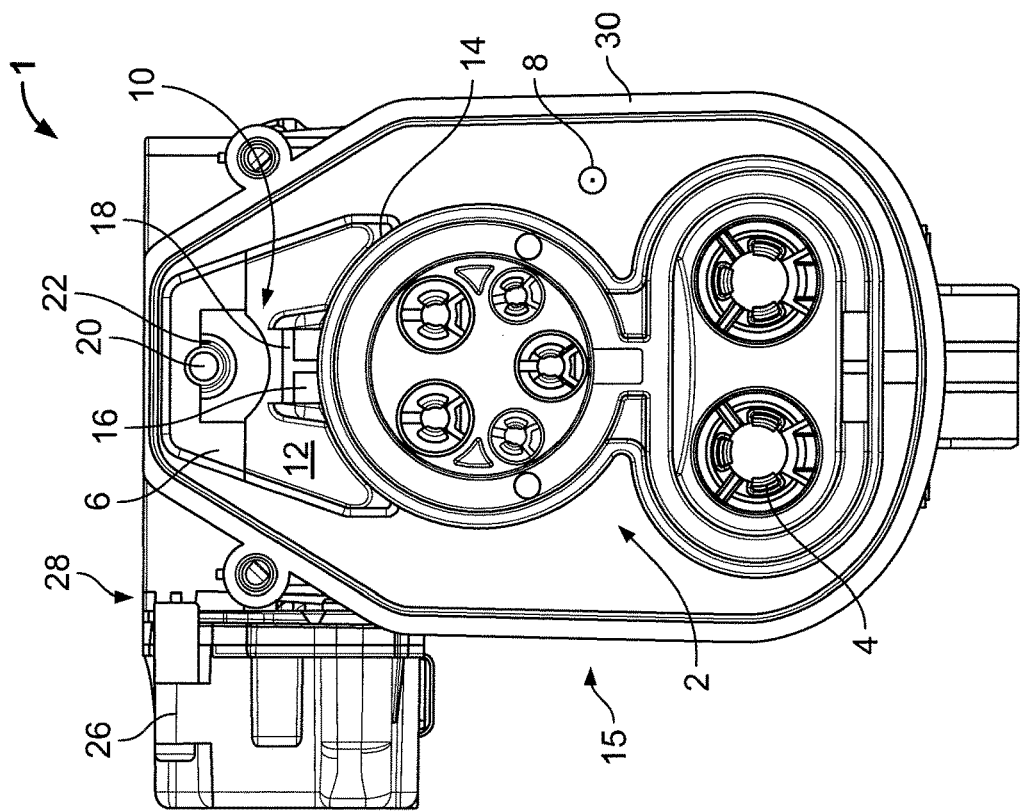
FIG. 1 is a perspective view of a plug socket according to an embodiment.
Figure 2:
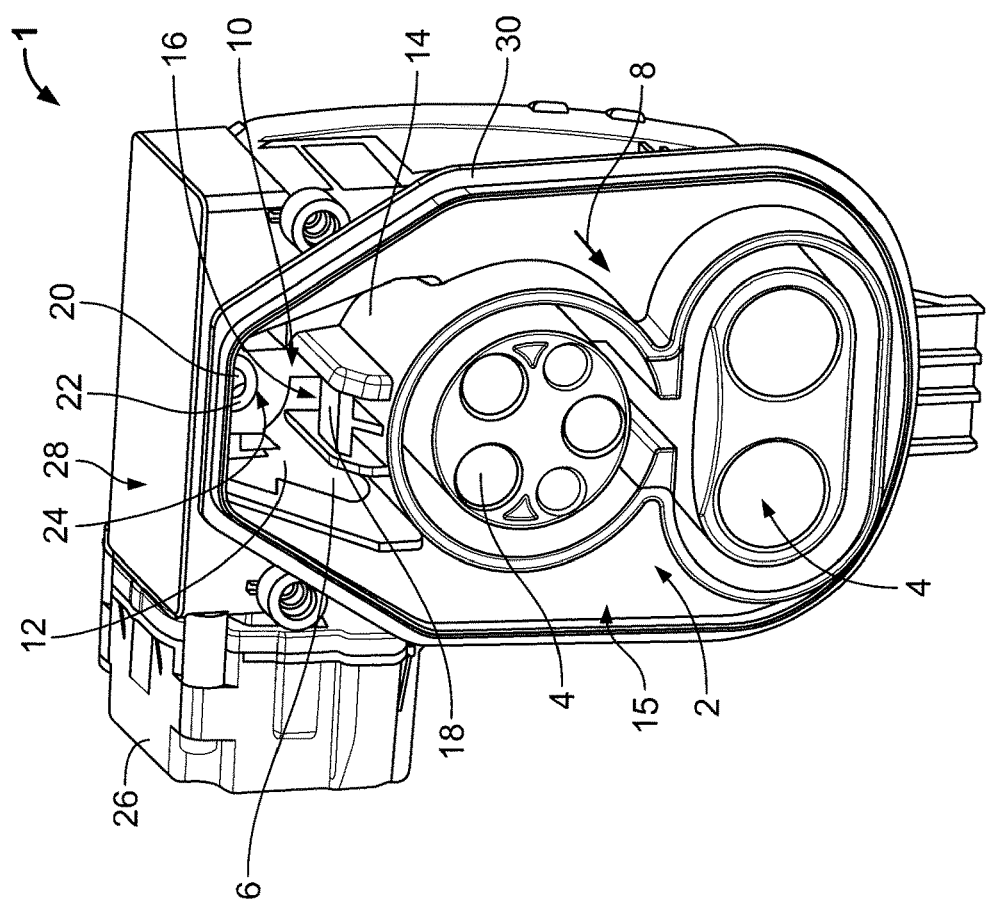
FIG. 2 is a front view of the plug socket.

A plug socket 1 according to an embodiment is shown in FIGS. 1 and 2. The plug socket 1 is, for example, a charging socket for charging electric vehicles which have a complementary charging plug, which is not depicted here. The plug socket 1 has a plug face 2 having a plurality of contacts 4 for energy transmission and data transmission.

The plug socket 1, as shown in FIGS. 1 and 2, has a recess 6 in which a part of the charging plug is received. The recess 6 opens, like the contacts 4, for example, in a plug-in direction 8. The recess 6 terminates in the plug-in direction 8 in an insertion opening 10, through which the charging plug is plugged into the recess 6. A bottom 12 is located at an end of the recess 6 which is opposite the insertion opening 10 in the plug-in direction 8.

The recess 6, as shown in FIGS. 1 and 2, can be separated by a wall 14 from regions 15 of the plug socket 1 which have the contacts 4. In such a case, the recess 6 serves only to receive and latch a latching element at the charging plug side. In an orientation of the charging socket 1 specified by an industry standard, the recess 6 can be located in particular above the plug socket regions 15 which have the contacts 4.

For latching the charging plug, the recess 6 has an undercut 16 shown in FIGS. 1 and 2 which acts in the plug-in direction 8. The undercut 16 is a depression in the recess 6 extending transverse to the plug-in direction 8. The undercut 16 is generated by a not necessarily solid blocking body 18 which is located between the undercut 16 and the insertion opening 10. The undercut 16 can be arranged, for example, between the contacts 4 and the recess 6. In an embodiment, the blocking body 18 is formed from only one rib which extends transverse to the plug-in direction 8.

To latch a charging plug, a latching hook or a different latching projection latches into the undercut 16. In order to block the latching hook in the latched position, a locking element 20 which is movable in the plug-in direction 8 can be provided, as shown in FIGS. 1 and 2. The locking element 20 can be configured pin-shaped or ram-shaped and penetrates the bottom 12. A sealing collar 22 can be provided between the bottom 12 and the locking element 20. In an embodiment, a cross-section of the locking element 20 is not circular.

The locking element 20 is shown in FIGS. 1 and 2 in a plug-in position in which it is moved along the plug-in direction 8 from an overlapping with the undercut 16. In order to move the locking element 20 linearly along the plug-in direction 8, an in particular enclosed drive member 26 can be provided which is shown in FIGS. 1 and 2 only by way of example as an electrically operated actuator. The drive member 26 and the locking element 20 can be part of a locking module 28 which can represent an assembly of the plug socket 1 which can be handled in one piece. The locking module 28 can be exchanged for other modules which have, for example, drive members 26 configured differently or drive members 26 arranged at other locations, or be attached to different plug sockets or in different positions. In the case of the socket 1 of FIGS. 1 and 2 which, in accordance with the standard, is always used in the depicted orientation, the drive member 26 is located, for example, at the side of a housing 30 which surrounds the plug face 2. As a result, a particularly compact design is possible.

The drive member 26 can be a mechanical, electrical, electro-magnetic and/or magnetic actuator, for example an engine, a mechanical, hydraulic or pneumatic spring, an electromagnet or the like. The drive member 26 can, in other embodiments, be a manually operated device, such as a lever or a knob. A combination of these variants is also possible. The drive movement of the drive member 26 can be translatory and/or rotatory.

Figure 3:
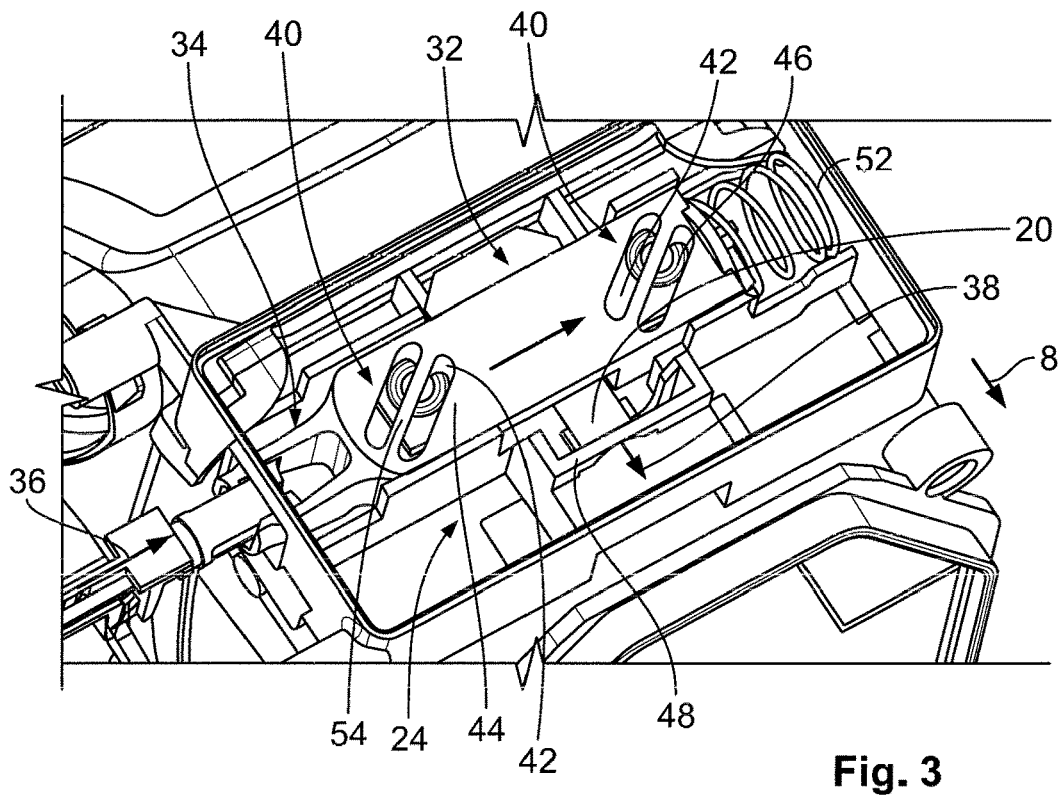
FIG. 3 is a perspective view of a deflection device of the plug socket in a plug-in position.
Figure 4:
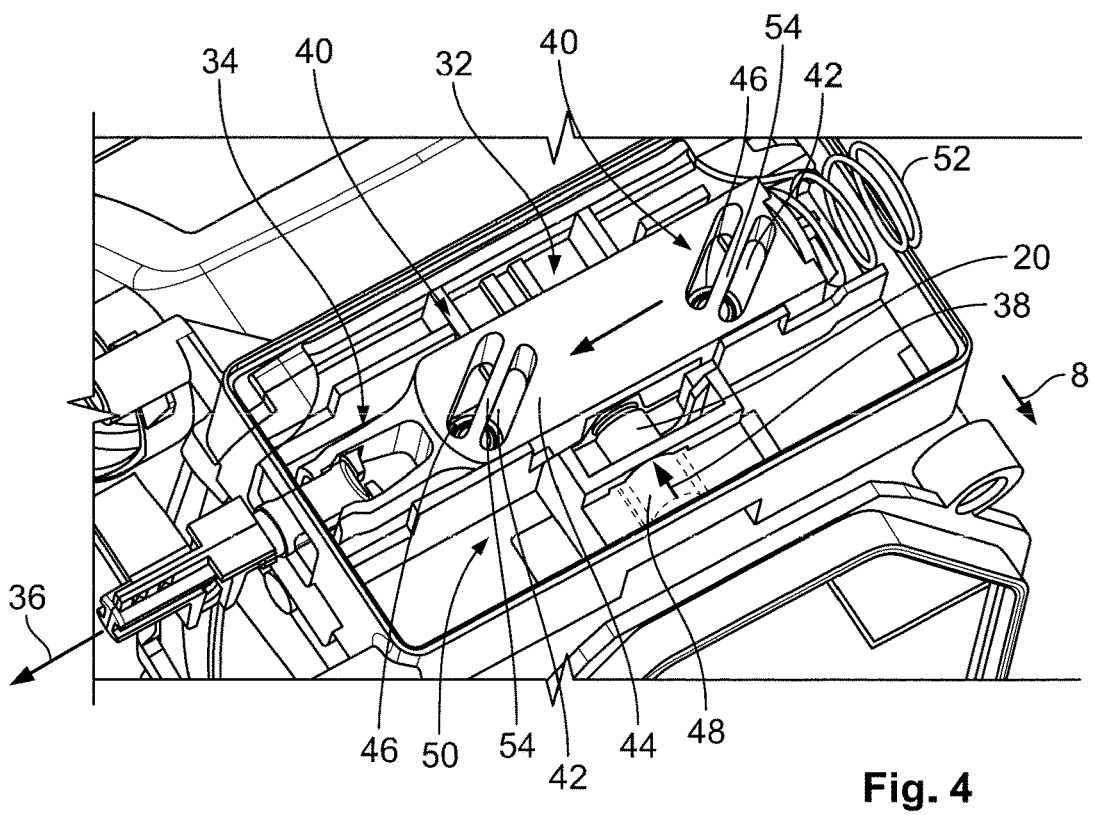
FIG. 4 is a perspective view of the deflection device of FIG. 3 in a blocking position.

FIGS. 3 and 4 show how the locking element 20 is moved in the plug-in direction 8 with the help of a deflection device 32. The deflection device 32 is located between the drive member 26 and the locking element 20. At a drive side 34 of the deflection device 32, the drive member 26 generates a, for example linear, movement in a direction 36 which is different from the direction 38 of the movement of the locking element 20, here the plug-in direction 8. In the depicted exemplary embodiment, the directions 36, 38 are at least approximately perpendicular to one another.

To deflect the drive movement in the direction 36, the deflection device 32 has at least one, and in the shown embodiment two, slotted guides 40 shown in FIGS. 3 and 4. In each slotted guide 40, a slot 42 is formed at a slider 44 which is linearly guided in the plug socket or the locking module 28. The slot 42 of a slotted guide 40 is, for example, a slit or a groove, which is inclined both relative to the direction 36 of the drive movement and to the direction 38 of the movement of the locking element 20. The degree of the inclination determines the translational ratio between the drive movement 36 and the movement of the locking element 20. FIGS. 3 and 4 show, only by way of example, that the slot 42 can be a linear slit which is inclined by 45°. Of course, curved slotted progressions are also possible.

A roller 46 runs in the slot 42. FIGS. 3 and 4 show that the slider 44 with the slot 42 is connected to the drive member 26 and the roller 46 which is guided in the slot 42 is connected to the locking element 20. This relationship can also be reversed, i.e. by the slider 44 being connected to the locking module 28 and the roller 46 being connected to the drive member 26; however, this would require a greater construction volume in the direction of movement 38 of the locking element 20 than the allocation depicted.

The slotted guide 40, the slot 42, the roller 46, the locking element 20 and/or the slider 44 can each be manufactured from plastics material as an injection-molded part or by an additional production method. In other embodiments, other configurations of the deflection device 32 are possible instead of a slot 42, for example in the form of a rod or a cam drive. The locking element 20 can also be driven directly by the drive member 26 without interposing a deflection device 32.

In the shown embodiment, a pair of slotted guides 40 which are spaced apart from one another transverse to the direction of movement 38 are provided, in order to be able to support torques acting on the locking element 20. In addition, the movement of the locking element 20 can be generated torque-free by two, as shown, slotted guides 40 arranged symmetrical to the locking element 20. This reduces the risk of the locking element 20 becoming wedged.

In the plug socket 1 or in the locking module 28, the locking element 20 is held movably in the direction of movement 38 and transverse thereto in a form-fitting manner. The form fit is achieved by a guide 48 shown in FIGS. 3 and 4. The form fit absorbs forces which act on the locking element 20 transverse to the direction of movement 38 and which are thus not transmitted to the deflection device 32.

FIG. 3 shows the locking element 20 in the plug-in position 24. In the plug-in position 24, the locking element 20 is located at the end point of its movement which is remote from the insertion opening 10. In order to move the locking element 20 in its direction of movement 38 into a blocking position 50, shown in FIG. 4, it is moved in the direction of the insertion opening 10 into the recess 6 until it overlaps the undercut 16 at least partially transverse to the plug-in direction 8. FIG. 4 shows the end point of the movement of the locking element 20 located at the insertion opening 10. The blocking position 50 is spaced apart from the plug-in position 24 in the plug-in direction 8. The locking element 20 is located closer to the insertion opening 10 in the blocking position 50 than in the plug-in position 24.

In the plug-in position 24, shown in FIG. 3, the slider 44 is moved in the direction 36 by the drive member 26 in order to reach the blocking position 50. The rollers 46 are moved along the slot 42 by this movement. By virtue of the guides 48, which permit a movement of the locking element 20 only in the direction 38, the relative movement between the roller 46 and slot 42 leads to a movement of the locking element 20 in the plug-in direction 8.

In order to transfer the locking element from the blocking position 50 shown in FIG. 4 back into the plug-in position 24 shown in FIG. 3, the movement of the slider 44 is reversed.

If a drive member 26 is used which can exert a drive force in only one direction, a restoring spring 52 is used, which, as shown in FIGS. 3 and 4, can act on the slider 44. If the drive member 26 is capable of generating a to-and-fro movement on its own initiative, a restoring spring 52 may be omitted. The deflection device 32 can be self-inhibiting at least in the direction from the locking element 20 towards the drive member 26, such that a force which acts on the locking element 20 is absorbed in the deflection device 32 and is not transmitted to the drive member 26.

The slot 42 does not need to have a continuous bottom or even any bottom at all. If the rollers 46 are, for example, captively retained at the locking element 20, then the slot 42 can be completely open on both sides. If, by contrast, the roller 46 is only fitted on the slot 42, an at least partial closure by a bar 54, for example, which can extend along the slot 42 is used to captively retain the roller 46.

FIG. 5 shows the locking module 28 without a plug socket 1 in the plug-in position 24. In this configuration, the locking module 28 can be secured to a plug socket 1. The elements of the deflection device 32 are shown again in FIG. 6 in an exploded depiction. As shown in FIG. 6, the locking element 20 protrudes from a base 56 which extends transverse to the direction of movement 38 of the locking element 20. The base 56 respectively forms an axle 58 on which a roller 46 is fitted.

The deflection device 32 is received in a housing 60 of the locking module 28, as shown in FIGS. 5 and 6. The housing 60 can be sealed by a cover 62 and have an opening 64 through which the drive side 34 of the deflection device 32 projects. The drive member 26 depicted in FIG. 5 can be attached to the side of the opening 64. The drive side 34 of the deflection device 32 can extend through the opening 64 into the drive member 26. A part of the drive member 26 can also optionally extend through the opening 64 into the housing 60.

The function of the locking element 20 is described hereinafter with reference to FIGS. 7-9.

In FIG. 7, a latching element 66 of a charging plug is latched in the undercut 16. The locking element 20 is located in the blocking position 50 in which it partially overlaps the undercut 16, i.e. is located over the undercut 16. When the latching element 66 is latched, the locking element 20 is moreover located above the latching element 66 or between the latched latching element 66 and a wall 68 of the recess 6, such that it blocks the movement of the latching element 66 out of the undercut 16. On the side facing away from the undercut 16, the locking element 20 is supported at the wall 68 of the recess 6. The guide 48 can be formed by the wall 68. A deflection force 70, directed out of the undercut 16, directed transverse to the direction of movement 38 of the locking element 20, is thus delivered directly to the plug socket 1 or the housing 30 thereof via the locking element 20. The wall 68 can form the guide 48 of the locking element 20.

FIG. 8 shows the locking element 20 in the plug-in position 24. The latching element 66 has just been moved out of the undercut 16 or is on the verge of snapping into the undercut 16. The latching element 66 is still lying on the blocking body 18. The locking element 20 frees the recess 6 for the latching element 66. Alternatively, the locking element 20 can also rest at a front side 72 of the latching element 66, for example under the effect of the restoring spring 52.

The locking element 20 is driven out of the plug-in position 24 shown in FIG. 8 in the direction of the blocking position 50 shown in FIG. 7 only after actuating the drive member 26. If, in this process of the locking element 20, the latching element 66 is located in the blocking position 70 shown in FIG. 7, the locking element 20 simply goes over the latching element 66 and blocks the position thereof. If, by contrast, the latching element 66 is not completely latched and if it still rests, as shown in FIG. 8, by virtue of an incomplete insertion of the charging plug into the plug socket 1, on the blocking body 18, the latching element 66 and thus the charging plug is pushed out of the plug socket 1 by the process of the locking element 20 moving between the plug-in position 24 and the blocking position 50.

In the intermediate position 74 of the locking element 20 between the plug-in position 24 and blocking position 50 shown in FIG. 9, an ejection force 76 acting in the plug-in direction 8 is generated by the drive member 26. The locking element 20 thus serves not only to block the latching of the charging plug in the plug socket 1 but also to eject the charging plug after the latching is released and/or in the case of incomplete latching.

In the plug socket 1, the locking element 20 moves in the plug-in direction 8 from the plug-in position 24 toward the insertion opening 10. The plug socket 1 consequently has a reduced height, which is important in many installation situations. On the other hand, the direction of movement of the locking element 20 coincides with the movement of the charging plug relative to the plug socket 1. When inserting the plug, the insertion movement of the charging plug acts directly on the locking element 20. The plug forces can thus be more easily controlled than in the case of a locking element 20 which is movable perpendicular to the plug-in direction 8 and which must be pushed aside via approach ramps and thus by a friction which can only be controlled with difficulty. Further, the blocking action of the locking element 20 runs perpendicular to the direction of movement of the locking element 20 in the case of the latched latching element 66. Even the largest forces thus cannot push the locking element 20 aside. Provided that the locking element 20 does not move out of the overlap with the undercut 16, thus releasing the block, the charging plug can only be removed by destroying the locking element 20.

What is claimed is:

1. A plug socket, comprising:
   a recess receiving a charging plug in a plug-in direction, the recess terminates in an insertion opening in the plug-in direction and has an undercut acting in the plug-in direction to latch a latching element of the charging plug; and
   a locking element movable from a plug-in position into a blocking position, the locking element in the plug-in position is located in the recess and overlaps the undercut transverse to the plug-in direction, the blocking position is spaced apart from the plug-in position in the plug-in direction and the locking element is located closer to the insertion opening in the blocking position than in the plug-in position.

2. The plug socket of claim 1, wherein, in the blocking position, the locking element is located in the recess between the undercut and a wall opposite the undercut transverse to the plug-in direction.

3. The plug socket of claim 1, wherein the locking element is held movably in the plug-in direction and in a form-fitting manner transverse to the plug-in direction.

4. The plug socket of claim 1, wherein the locking element crosses a bottom of the recess that is opposite to the insertion opening.

5. The plug socket of claim 1, wherein the locking element is pin-shaped at least in a region that is movable into the recess.

6. The plug socket of claim 1, further comprising a drive member.

7. The plug socket of claim 6, wherein the drive member generates an ejection force onto the locking element towards the insertion opening in the plug-in position and/or in a locking element intermediate position between the plug-in position and the blocking position.

8. The plug socket of claim 6, wherein the drive member is spaced apart from the recess.

9. The plug socket of claim 6, wherein the drive member is connected to the locking element via a deflection device.

10. The plug socket of claim 9, wherein a direction of movement of the deflection device at a drive side has a different direction than a direction of movement of the locking element from the plug-in position into the blocking position.

11. The plug socket of claim 9, wherein the deflection device has a slotted guide.

12. The plug socket of claim 11, wherein the slotted guide has a roller guided into a slot.

13. The plug socket of claim 11, wherein the slotted guide is formed in a slider that is linearly guided in the plug socket.

14. A locking module for a plug socket, comprising:
a drive member;
a locking element linearly movable by the drive member; and
a deflection device arranged between the drive member and the locking element and connected to the drive member and the locking element, a direction of movement of the deflection device at a drive side has a different direction than a direction of movement of the locking element, the deflection device has a slotted guide, the slotted guide had a roller guided into a slot.

15. A locking module for a plug socket, comprising:
a drive member;
a locking element linearly movable by the drive member; and
a deflection device arranged between the drive member and the locking element and connected to the drive member and the locking element, a direction of movement of the deflection device at a drive side has a different direction than a direction of movement of the locking element, the deflection device has a slotted guide, the slotted guide is formed in a slider that is linearly guided in the plug socket.

* * * * *